Nov. 11, 1958 G. SLAYTER 2,859,506
APPARATUS FOR PRODUCING A FILAMENTARY MAT MATERIAL
Filed April 21, 1955 2 Sheets-Sheet 1
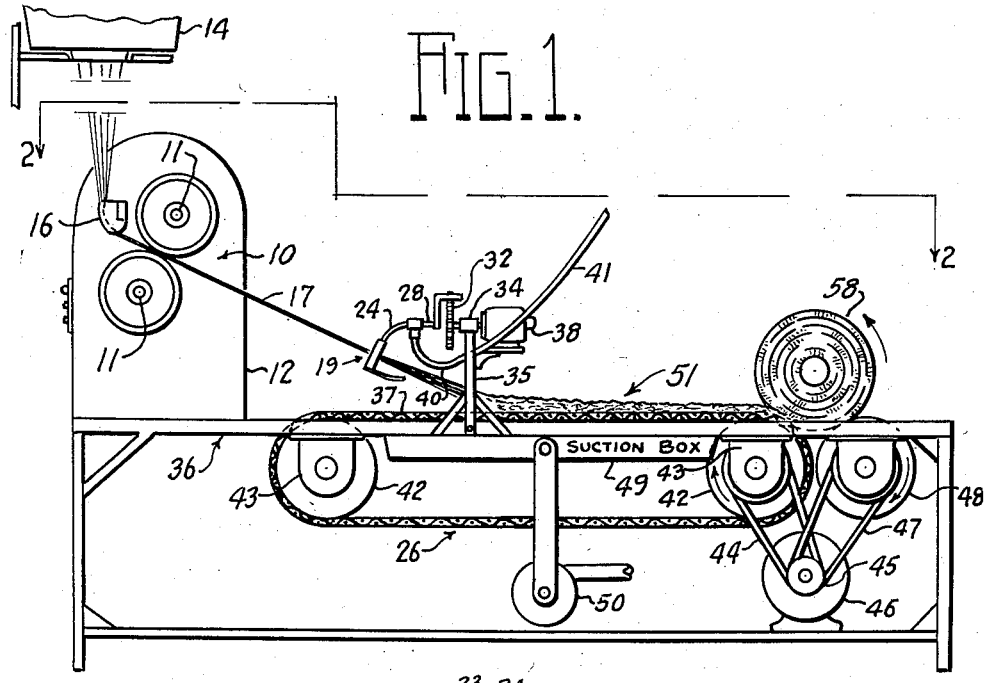
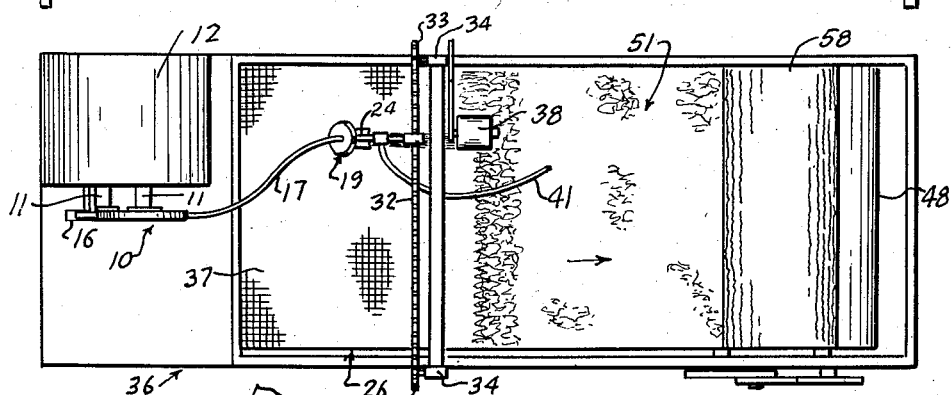
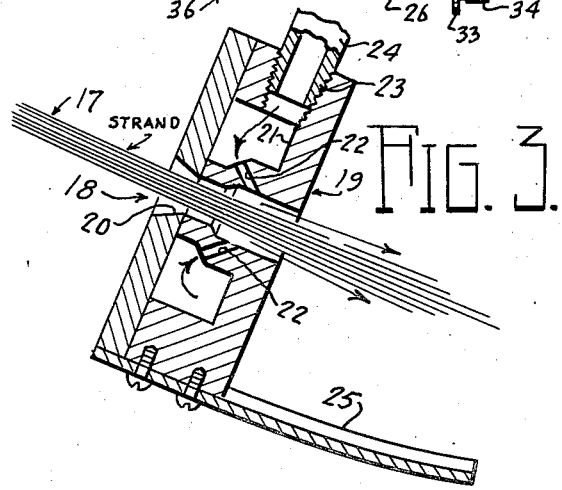
INVENTOR.
Games Slayter
BY
ATTORNEYS Nov. 11, 1958   G. SLAYTER   2,859,506
APPARATUS FOR PRODUCING A FILAMENTARY MAT MATERIAL
Filed April 21, 1955   2 Sheets-Sheet 2
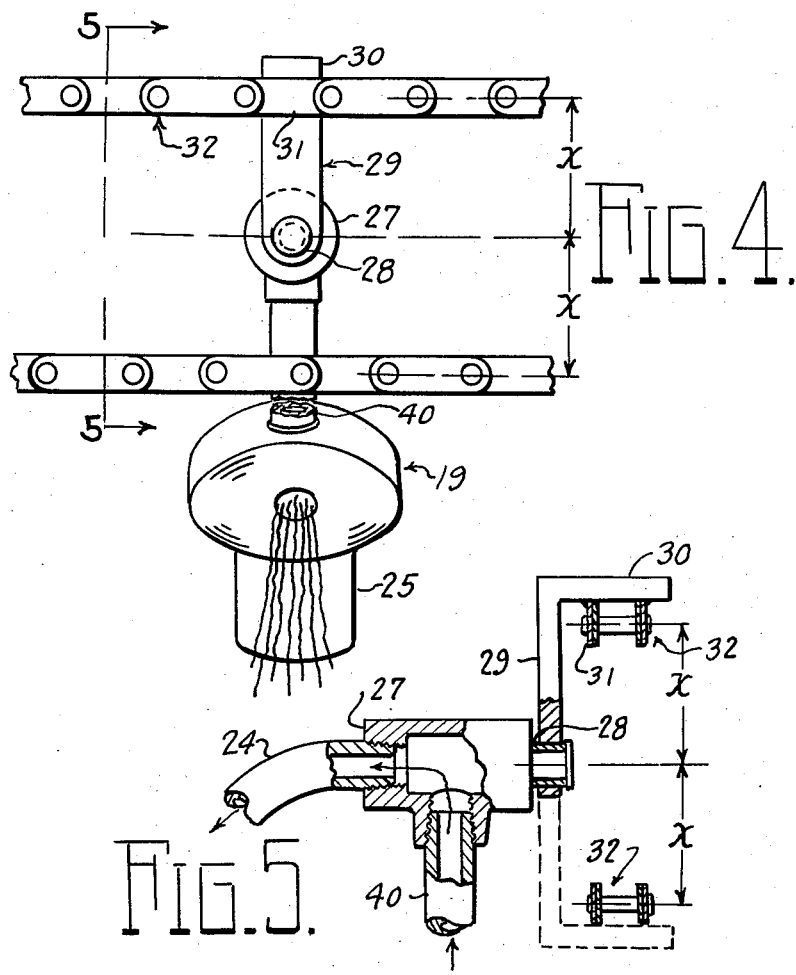
INVENTOR.
Games Slayter
BY
ATTORNEYS

United States Patent Office 2,859,506
Patented Nov. 11, 1958

2,859,506

APPARATUS FOR PRODUCING A FILAMENTARY MAT MATERIAL

Games Slayter, Newark, Ohio, assignor to Owens-Corning Fiberglas Corporation, a corporation of Delaware Application April 21, 1955, Serial No. 502,845

2 Claims. (Cl. 28—1)

This invention relates to method and apparatus for producing filamentary mat material and more particularly to method and apparatus for producing a continuous blanket of heterogeneously disposed loops and swirls of a continuous multifilament strand.

In illustrating the invention, the method and apparatus will be shown and described in connection with the continuous production of a thin blanket or mat formed from a continuously produced glass fiber strand. The product which will be described as being produced through the practice of the invention is particularly suitable for the reinforcement of thin, resinous sheet material and possesses the additional advantage of adapting itself to complex curvatures.

It has been known to reinforce resinous sheet material through the use of cloth or woven fabrics made from both natural and synthetic materials. For example, resinous sheet material bodies have been made by laying strips of canvas over a form and impregnating the layers of canvas with a resinous material such as urea formaldehyde and then setting up the resinous material, for example, in an autoclave, to form a permanent shaped body having a relatively thin section which is reinforced and strengthened by the canvas fabric extending throughout the mass. Similar structures have been fabricated utilizing woven glass fiber cloth in combination with various resins, for example, polyesters. In the use of woven fabrics or cloth, however, some difficulty is encountered in shaping the cloth to a form having a compound curvature. It is frequently necessary either to cut the cloth carefully so that it forms segments, as it were, of the curvature or to attempt to stretch or compress the cloth laterally when it is placed on the form. In addition, of course, a number of manufacturing steps are required to convert any filamentary material to a cloth, such steps considerably increasing the cost of manufacture and the cost of the finished reinforced resinous sheet material.

It is the principal object of the method and apparatus of this invention to produce a sheet-like product which will conform itself to complex curvatures and will provide the great strengthening power of glass fiber strands in thin resinous sections having these compound curvatures.

It is, therefore, an object of this invention to provide a method and apparatus for the production of a relatively thin blanket or sheet-like mass of heterogeneously arranged loops and swirls from a continuous filamentary strand without any intermediate packaging and weaving or other manufacturing steps.

It is another object of this invention to provide a method and apparatus for the production of a thin blanket or sheet-like mat of continuous multifilament glass fiber strand which is produced concomitantly with the production of the strand itself and with a minimum of manufacturing steps and cost.

These objects and the manner of their achievement will be better understood from the specification which follows and from the drawings, in which:

Fig. 1 is a view in elevation with certain parts being shown in section of an apparatus embodying the invention and on which the method of the invention may be carried out.

Fig. 2 is a generally plan view taken substantially from the position indicated by the line 2—2 in Fig. 1.

Fig. 3 is a greatly enlarged, fragmentary, vertical sectional view through a strand guide and blower means utilized in the apparatus shown in Figs. 1 and 2.

Fig. 4 is a greatly enlarged, fragmentary view in elevation, with parts being shown in section, of mechanism for traversing the strand guide and blower means of Fig. 3.

Fig. 5 is a fragmentary, partly sectional, view taken substantially along the line 5—5 of Fig. 4.

Fig. 6 is a fragmentary plan view of a portion of the product produced on the apparatus illustrated in Figs. 1-5 and according to the method of the invention.

Fig. 7 is a fragmentary, somewhat diagrammatic view in elevation and section, taken from the side of the product produced according to the invention.

In practicing the invention, apparatus as illustrated in Figs. 1-5 may be employed, which apparatus in the form shown also constitutes a part of the invention. The apparatus illustrated comprises, among other parts, a pair of co-acting high speed pulling wheels 10 mounted upon parallel, spaced, horizontal axes 11 with a plane through the axes 11 being so inclined to the vertical that a line tangential to the co-acting peripheries of the pulling wheels 10 is downwardly inclined to the horizontal. The two pulling wheels 10 are supported and rotated at high speed by suitable mechanism (not shown) located within a drive housing generally indicated at 12.

A continuous multifilament glass fiber strand is attenuated by the high speed pulling wheels 10 from streams of molten glass which flow through minute orifices of a bushing 13 located at the bottom of a glass melter or molten glass supply tank 14. Individual continuous filaments 15 are collected together and led around a guide 16 to form them into a strand 17 and to direct the strand 17 into the bite between the pulling wheels 10. The speed of rotation of the pulling wheels 10 and their diameters are such that the lineal speed of movement of the strand 17 is in the order of 8,000 to 10,000 feet per minute.

While the invention is illustrated and will be described in connection with the fabrication of a finished product from a continuous multifilament glass fiber strand attenuated and formed by the pulling wheels 10 continuously as it is needed for the fabrication of the finished product, it will be appreciated that the method and apparatus of the invention may also be employed for the production of the finished product from filamentary or fibrous material other than glass or from glass filaments previously produced and presented in the form of a supply such as a multiplicity of spools or reels of continuous strands.

The method and apparatus of the invention, however, is particularly adapted for the fabrication of the final product from a continuous multifilament glass fiber strand because a fiber forming mineral material such as glass can be continuously produced from a molten supply at a lineal speed sufficiently high to enable the production of the finished product directly, i. e., without intervening winding and unwinding steps. The direct application of the continuously produced multifilament glass fiber strand according to the invention thus has the advantage of eliminating conventional winding, unwinding and weaving operations such as those employed in the textile industry where the filamentary material is produced and wound upon spools or packages and then, at a later date, unwound and woven or knitted to form a fabric or cloth which is then utilized for the reinforcement of thin resinous bodies.

The continuous multifilament strand 17 which may comprise over 200 individual continuous fibers or filaments 15 is projected from between the bite of the high speed pulling wheels 10 as a "driving strand," i. e., it is projected longitudinally with such speed that it will cross a substantial open gap without appreciable loss of impetus. In apparatus embodying the invention and according to the method of the invention, the driving strand 17 is initially guided and then feeds itself through a central bore generally indicated at 18 in an air blower 19 (Fig. 3).

The central bore 18 is shown as having a slightly flared entrance 20 and is connected to an internal blower manifold 21 by a plurality of inclined passageways 22 leading from the manifold 21 to the exit side of the bore 18. A tapped hole 23 leads into the manifold 21 and a curved support pipe 24 is threaded thereinto for both mechanical and pneumatic connection to the blower 19. In the embodiment illustrated in the drawings the blower 19 has a small skirt 25 at its lower side.

The blower pipe 24 serves both to support the blower 19 and to provide a supply of air under pressure to the manifold 21 of the blower 19. Air under pressure in the manifold 21 rushes through the passageways 22 and into the bore 18 where it entrains the strand 17 with sufficient force to take up any slack in the strand 17 coming from the pulling wheels 10 and to insure the retention of the strand 17 in the blower 19 when the blower 19 is reciprocated or traversed laterally back and forth as a strand guide across a generally horizontal conveyor indicated at 26.

The upper end of the support pipe 24 (Fig. 5) is threaded into the end of a coupling 27, the coupling 27 having a stem 28 pivotally mounted in the lower end of a right angle bracket 29, the upper, horizontal arm 30 of which is welded or otherwise secured to a link 31 of a traversing chain generally indicated at 32. The chain 32 is supported by a pair of sprockets 33 mounted upon shafts (not shown) whch are rotatably mounted in bearings 34 secured on the upper ends of support posts 35 erected from a conveyor table frame generally indicated at 36. The posts 35 are mounted at opposite sides of the table frame 36 so that the traversing chain 32 extends across the conveyor 26 at a level above its upper collecting span 37. One of the sprockets 33 is driven at a controlled speed by a drive motor 38 suitably mounted on a cross arm 39 extending between the upper ends of the support posts 35. Rotation of the sprockets 33 runs the chain 32 and carries the link 31 and the bracket 29 secured thereto back and forth across the table 36 and above the conveyor span 37.

As best can be seen in Figs. 4 and 5 the center line of the stem 28 is midway between the center lines of the spans of the chain 32 in its upper and lower reaches so that as the arm 30 of the support bracket 29 moves across the table 36 with the chain 32, the center line of the stem 28 and thus of the coupling 27 remains in the same plane. This equidistant spacing is indicated by the arrows "x" in Figs. 4 and 5. By reason of this arrangement the level of the blower 19 above the collecting span 37 of the conveyor 26 is kept the same throughout its reciprocal travel.

The coupling 27 has a nipple 40 by which an air hose 41 (Fig. 1) connects it to a source of air under pressure.

The conveyor 26 is mounted on a pair of drums 42 which are rotatably supported by bearing blocks 43 mounted on the table 36 and the drum 42 is driven by a drive belt 44 engaged in a drive pulley 45 of a motor 46. The motor 46 also drives a belt 47 which is engaged by a driving pulley on a roll up drum 48.

Beneath the collecting span 37 of the conveyor 26 and between the members of the conveyor frame 36 there may be located a generally horizontal suction box 49 connected by suitable piping to a blower 50.

The pressure of the air fed through the pipe 41, the nipple 40, coupling 27 and support pipe 24 to the blower 19, is maintained at such a level that the entraining force applied to the strand 17 as it passes through the blower 19 is sufficient to take up the strand 17 as fast as it is presented by the rotary pulling wheels 10. The air force also slightly opens up the strand 17 as it emerges from the blower 19 separating its individual filaments slightly one from the other and softening the strand so that as it strikes the conveyor 26 it is not shattered or broken. The traversing speed of the chain 32 is so selected with respect to the lineal speed of the strand 17 that the strand impinges upon the conveyor 26 in random disposed loops and swirls building up a layer of such loops and swirls for each pass across the conveyor span 37. The conveyor 26 is driven at such speed that each layer is lapped slightly with respect to each preceding layer and the impetus of the strand is such that portions of each or at least some of the loops and swirls formed engage between and under previously formed loops and swirls. Fig. 6 is illustrative of a small section of a finished product, i. e., the blanket or sheet-like mass of multifilament glass fiber strand generally indicated at 51 in Figs. 1 and 2. In Fig. 6 a previously laid strip or layer of continuous strand is indicated at 52 and shown in solid line. A later laid, second layer, or reach of strand is generally indicated at 53. At the points indicated by the reference numbers 54 and 55 it can be seen how certain loops or swirls of the second layer or wave of strand 53 has been driven beneath and between loops and layers or portions of the first length of strand 52.

As can be seen in Figs. 1 and 7, the lower ends of the loops and swirls, generally indicated at 56 in Fig. 7, strike the surface of the conveyor span 37 and are stopped whereas the upper lengths of each layer generally indicated at 57 lay over slightly against the previously deposited cross layers of strand so that the face of the mat 51 at its formation is inclined. Because of suction through the conveyor span 37 the stretches or layers of loops and swirls of strand are gradually flattened down as the collection span 37 of the conveyor progresses along the table 36.

As the blanket or sheet-like mass 51 of loops and swirls of continuous strand is moved along by the collection span 37 of the conveyor 26 to the end of the conveyor 26, it may be rolled up to form a roll 58 by engaging its exterior with the roll up roller 48. The roll 58 gradually increases in size as more of the blanket 51 is rolled thereon and the lineal speed of rolling is, of course, maintained in agreement with the lineal speed of movement of the collecting span 37 of the conveyor 26.

Because of the interlocking or interengagement of the portions of loops and swirls of strand in each successive transverse layer of strand as it is formed across the receding front of the blanket 51 (those interengagements indicated by the reference numbers 54 and 55 in Figs. 6 and 7) the sheet or blanket-like mass 51 possesses sufficient tensile strength in the directions of its major dimensions to permit the roll 58 to be unrolled and a portion of the sheet or mass 51 to be handled somewhat like a sheet of fabric in producing reinforced plastic sheet material. The random disposition of the loops and swirls of strand provides great tensile strength extending in all directions throughout the mass of resinous sheet material which the blanket or sheet 51 reinforces.

I claim:

1. Apparatus for producing a continuous blanket-like mass of filamentary material, said apparatus comprising, in combination, high speed rotary pulling means for feeding a multifilament strand from a source and for linearly projecting said strand generally horizontally across an open space and along a first longitudinal path leading away from said pulling means, a collecting conveyor mounted for movement in the direction of projection of said strand along said path and in a plane inclined upwardly relative to said path, said conveyor extending substantially equidistantly on both sides of the path of said strand, an axially bored guide mounted for reciprocation along a horizontal path transverse to and extending completely across said conveyor and intersecting the path of said strand, air jet means in said guide for projecting said strand therebeyond in a second linear path and means for reciprocating said guide whereby the first path of stand strand and said strand moving therealong is angularly traversed between said pulling means and said guide and the second path of said strand and said strand moving therealong is translatably traversed by and beyond said guide.

2. Apparatus according to claim 1 in which the bore of said guide is upwardly inclined and parallel to the first path of said strand, the first path of said strand originates generally along the longitudinal center of said conveyor and the translatory path of movement of said guide intersects the first path of said strand.

References Cited in the file of this patent
UNITED STATES PATENTS

| | | |
|---|---|---|
| 1,167,950 | Stiles et al. | Jan. 11, 1916 |
| 2,371,458 | Meyer et al. | Mar. 13, 1945 |
| 2,392,882 | Roberts | Jan. 15, 1946 |
| 2,571,025 | Fletcher | Oct. 9, 1951 |
| 2,588,774 | Bastian et al. | Feb. 26, 1952 |
| 2,638,146 | Rounseville et al. | May 12, 1953 |